(12) United States Patent
Koskela et al.

(10) Patent No.: US 11,973,564 B2
(45) Date of Patent: Apr. 30, 2024

(54) BEAM FAILURE DETECTION FOR DORMANT BANDWIDTH PARTS IN CELLULAR COMMUNICATION NETWORKS

(71) Applicant: Nokia Technologies Oy, Espoo (FI)

(72) Inventors: Timo Koskela, Oulu (FI); Jarkko Tuomo Koskela, Oulu (FI); Samuli Heikki Turtinen, Ii (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 42 days.

(21) Appl. No.: 17/150,411

(22) Filed: Jan. 15, 2021

(65) Prior Publication Data

US 2021/0226684 A1 Jul. 22, 2021

Related U.S. Application Data

(60) Provisional application No. 62/964,221, filed on Jan. 22, 2020.

(51) Int. Cl.
*H04W 72/04* (2023.01)
*H04B 7/06* (2006.01)
(Continued)

(52) U.S. Cl.
CPC ........... *H04B 7/088* (2013.01); *H04B 7/0695* (2013.01); *H04L 5/0042* (2013.01);
(Continued)

(58) Field of Classification Search
CPC ..... H04B 7/088; H04B 7/0695; H04L 5/0037; H04L 5/0042; H04L 5/0048; H04L 5/0092; H04L 47/746; H04W 36/0079; H04W 36/305; H04W 72/042; H04W 72/0453; H04W 72/046; H04W 72/0493;
(Continued)

(56) References Cited

U.S. PATENT DOCUMENTS 10,863,570 B2 * 12/2020 Cirik ................. H04W 72/0446
2019/0173740 A1 * 6/2019 Zhang ................. H04L 41/0677
(Continued)

FOREIGN PATENT DOCUMENTS

CN 110351112 A 10/2019
CN 110475260 A 11/2019
(Continued)

OTHER PUBLICATIONS

"Revised WID: Enhancements on MIMO for NR", 3GPP TSG RAN Meeting #85, RP-192271, Samsung, Agenda Item: 9.4.1, Sep. 16-20, 2019, 5 pages.
(Continued)

*Primary Examiner* — Romani Ohri
(74) *Attorney, Agent, or Firm* — Brake Hughes Bellermann LLP

(57) ABSTRACT

According to an example aspect of the present invention, there is provided a method comprising, determining a beam failure detection reference signal configuration for a dormant bandwidth part based on a beam failure detection reference signal configuration of another bandwidth part and performing beam failure detection on the dormant bandwidth part according to the determined beam failure detection reference signal configuration.

20 Claims, 4 Drawing Sheets

(51) Int. Cl.
| | |
|---|---|
| *H04B 7/08* | (2006.01) |
| *H04L 5/00* | (2006.01) |
| *H04W 36/30* | (2009.01) |
| *H04W 72/044* | (2023.01) |
| *H04W 72/0453* | (2023.01) |
| *H04W 72/23* | (2023.01) |
| *H04W 72/53* | (2023.01) |
| *H04W 72/54* | (2023.01) |
| *H04W 76/18* | (2018.01) |
| *H04W 76/19* | (2018.01) |
| *H04W 24/04* | (2009.01) |

(52) U.S. Cl.
CPC .......... *H04L 5/0048* (2013.01); *H04L 5/0092* (2013.01); *H04W 36/305* (2018.08); *H04W 72/0453* (2013.01); *H04W 72/046* (2013.01); *H04W 72/23* (2023.01); *H04W 72/53* (2023.01); *H04W 72/54* (2023.01); *H04W 76/18* (2018.02); *H04W 76/19* (2018.02); *H04W 24/04* (2013.01)

(58) Field of Classification Search
CPC ..... H04W 72/08; H04W 76/18; H04W 76/19; H04W 24/04
See application file for complete search history.

(56) References Cited

U.S. PATENT DOCUMENTS

| | | | | |
|---|---|---|---|---|
| 2019/0261244 | A1* | 8/2019 | Jung | H04W 36/305 |
| 2019/0319833 | A1* | 10/2019 | Nagaraja | H04L 5/001 |
| 2019/0357291 | A1* | 11/2019 | Zhou | H04W 76/19 |
| 2019/0357292 | A1* | 11/2019 | Cirik | H04L 5/0053 |
| 2021/0058136 | A1* | 2/2021 | Yang | H04W 24/08 |
| 2021/0176029 | A1* | 6/2021 | Tsai | H04L 5/0098 |
| 2021/0176030 | A1* | 6/2021 | Tsai | H04B 7/0626 |
| 2021/0203468 | A1* | 7/2021 | Yi | H04W 52/0229 |
| 2022/0330155 | A1* | 10/2022 | Cheng | H04W 52/0235 |

FOREIGN PATENT DOCUMENTS

| | | |
|---|---|---|
| WO | 2019159004 A1 | 8/2019 |
| WO | 2019/214636 A1 | 11/2019 |

OTHER PUBLICATIONS

"3rd Generation Partnership Project; Technical Specification Group Radio Access Network; NR; Physical layer procedures for control (Release 15)", 3GPP TS 38.213, V15.7.0, Sep. 2019, pp. 1-108.

"3rd Generation Partnership Project; Technical Specification Group Radio Access Network; NR; Medium Access Control (MAC) protocol specification (Release 15)", 3GPP TS 38.321, V15.7.0, Sep. 2019, pp. 1-78.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

Extended European Search Report received for corresponding European Patent Application No. 21151264.5, dated Jun. 7, 2021, 12 pages.

"Remaining issues on mechanism to recover from beam failure", 3GPP TSG RAN WGl Meeting #92bis, Vivo, R1-1803818, Agenda Item: 7.1.2.2.4, Apr. 16-20, 2018, 6 pages.

"Considerations on power saving for NR", 3GPP TSG RAN WG1 Ah-Hoc Meeting 1901, LG Electronics, R1-1900602, Agenda Item: 7.2.9.4, Jan. 21-25, 2019, 5 pages.

Office Action for Chinese Patent Application No. 202110083893.0, dated Oct. 31, 2023, 13 pages.

* cited by examiner

BEAM FAILURE DETECTION FOR DORMANT BANDWIDTH PARTS IN CELLULAR COMMUNICATION NETWORKS

RELATED APPLICATION

This application claims priority from Provisional Patent Application No. 62/964,221 filed on Jan. 22, 2020, which is hereby incorporated in its entirety.

FIELD

Various example embodiments relate in general to cellular communication networks and more specifically, to beam failure detection for dormant bandwidth parts in such networks.

BACKGROUND

Beam failure detection may be used in various cellular communication networks, such as, in cellular communication networks operating according to 5G radio access technology. 5G radio access technology may also be referred to as New Radio, NR, access technology. 3$^{rd}$ Generation Partnership Project, 3GPP, develops standards for 5G/NR. One of the topics in the 3GPP discussions is related to beam failure detection and there is a need to provide improved methods, apparatuses and computer programs related to beam failure detection, e.g., when dormant Bandwidth Parts, BWPs, are used.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the present invention, there is provided an apparatus comprising at least one processing core, at least one memory including computer program code, the at least one memory and the computer program code being configured to, with the at least one processing core, cause the apparatus at least to perform, determine a beam failure detection reference signal configuration for a dormant bandwidth part based on a beam failure detection reference signal configuration of another bandwidth part and perform beam failure detection on the dormant bandwidth part according to the determined beam failure detection reference signal configuration. The apparatus of the first aspect may be a User Equipment, UE, or a control device configured to control the functioning thereof, possibly when installed therein.

Embodiments of the first aspect may comprise at least one feature from the following bulleted list:

- the at least one memory and the computer program code are further configured to, with the at least one processing core, cause the apparatus at least to perform, determine the beam failure detection reference signal configuration for the dormant bandwidth part based on the beam failure detection reference signal configuration of said another bandwidth part upon detecting that no active transmission configuration indicator state for a downlink control channel or an explicit configuration of the beam failure detection reference signal for the dormant BWP has been provided;
- said another bandwidth part is a non-dormant bandwidth part or a regular bandwidth part;
- the at least one memory and the computer program code are further configured to, with the at least one processing core, cause the apparatus at least to perform, assume that the beam failure detection reference signal configuration for the dormant bandwidth part is based on active transmission configuration indicator states for a downlink control channel of said another bandwidth part;
- the at least one memory and the computer program code are further configured to, with the at least one processing core, cause the apparatus at least to perform, determine the beam failure detection reference signal configuration for the dormant bandwidth part based on the beam failure detection reference signal configuration of said another bandwidth part when a frequency domain location and bandwidth of said another bandwidth part correspond to a frequency domain location and bandwidth of the dormant bandwidth part;
- the at least one memory and the computer program code are further configured to, with the at least one processing core, cause the apparatus at least to perform, determine the beam failure detection reference signal configuration signal for the dormant bandwidth part based on the beam failure detection reference signal configuration of said another bandwidth part when a frequency domain location and bandwidth of said another bandwidth part comprise a frequency domain location and bandwidth of the dormant bandwidth part;
- said another bandwidth part is a bandwidth part of a serving cell of the apparatus;
- the apparatus is associated with a cell and said another bandwidth part is a bandwidth part of the same cell. Alternatively, the apparatus is associated with a cell and said another bandwidth part is a bandwidth part of another cell;
- the beam failure detection reference signal configuration of said another bandwidth part is a beam failure detection reference signal configuration of a group of bandwidth parts and the group of bandwidth parts comprises said another bandwidth part;
- the at least one memory and the computer program code are further configured to, with the at least one processing core, cause the apparatus at least to perform, receive a configuration, wherein the received configuration indicates from which bandwidth part the beam failure detection reference signal configuration for the dormant bandwidth part is to be determined and determine the beam failure detection reference signal configuration for the dormant bandwidth part based on the received configuration;
- the at least one memory and the computer program code are further configured to, with the at least one processing core, cause the apparatus at least to perform, receive the beam failure detection reference signal configuration of said another bandwidth part, wherein the another beam failure detection reference signal configuration of said bandwidth part is usable for performing beam failure detection on the dormant bandwidth;
- the apparatus is inactive in terms of control channel monitoring on the dormant bandwidth part; and the at least one memory and the computer program code are further configured to, with the at least one processing core, cause the apparatus at least to perform said beam failure detection according to the determined beam failure detection reference signal configuration by monitoring a downlink channel on the dormant bandwidth part according to the determined configuration.

According to a second aspect of the present invention, there is provided an apparatus comprising at least one processing core, at least one memory including computer program code, the at least one memory and the computer program code being configured to, with the at least one processing core, cause the apparatus at least to perform determine that there is no need to provide an active transmission configuration indicator state for a downlink control channel or an explicit configuration of a beam failure detection reference signal configuration, to be used for determining a beam failure detection reference signal configuration for a dormant bandwidth part and transmit, to a user equipment, a beam failure detection reference signal configuration of another bandwidth part, wherein the beam failure detection reference signal configuration of said another bandwidth is usable for performing beam failure detection on the dormant bandwidth. The apparatus of the second aspect may be a Base Station, BS, or a control device configured to control the functioning thereof, possibly when installed therein.

Embodiments of the second aspect may comprise at least one feature from the following bulleted list:
- said another bandwidth part is a non-dormant bandwidth part or a regular bandwidth part;
- said another bandwidth part is a bandwidth part of a serving cell of the user equipment;
- the user equipment is associated with a cell and said another bandwidth part is a bandwidth part of the same cell;
- the user equipment is associated with a cell and said another bandwidth part is a bandwidth part of another cell;
- the beam failure detection reference signal configuration of said another bandwidth part is a beam failure detection reference signal configuration of a group of bandwidth parts and the group of bandwidth parts comprises said another bandwidth part;
- the at least one memory and the computer program code are further configured to, with the at least one processing core, cause the apparatus at least to perform said beam failure detection according to the determined beam failure detection reference signal configuration by monitoring a downlink channel on the dormant bandwidth part according to the determined configuration.

According to a third aspect of the present invention, there is provided an apparatus comprising means for determining a beam failure detection reference signal configuration for a dormant bandwidth part based on a beam failure detection reference signal configuration of another bandwidth part and means for performing beam failure detection on the dormant bandwidth part according to the determined beam failure detection reference signal configuration. The apparatus of the third aspect may be a User Equipment, UE, or a control device configured to control the functioning thereof, possibly when installed therein.

According to a fourth aspect of the present invention, there is provided an apparatus comprising means for determining that there is no need to provide an active transmission configuration indicator state for a downlink control channel or an explicit configuration of a beam failure detection reference signal configuration, to be used for determining a beam failure detection reference signal configuration for a dormant bandwidth part and means for transmitting, to a user equipment, a beam failure detection reference signal configuration of another bandwidth part, wherein the beam failure detection reference signal configuration of said another bandwidth is usable for performing beam failure detection on the dormant bandwidth. The apparatus of the fourth aspect may be a Base Station, BS, or a control device configured to control the functioning thereof, possibly when installed therein.

According to a fifth aspect, there is provided a first method comprising determining a beam failure detection reference signal configuration for a dormant bandwidth part based on a beam failure detection reference signal configuration of another bandwidth part and performing beam failure detection on the dormant bandwidth part according to the determined beam failure detection reference signal configuration.

According to a sixth aspect, there is provided a second method comprising determining that there is no need to provide an active transmission configuration indicator state for a downlink control channel or an explicit configuration of a beam failure detection reference signal configuration, to be used for determining a beam failure detection reference signal configuration for a dormant bandwidth part and transmitting, to a user equipment, a beam failure detection reference signal configuration of another bandwidth part, wherein the beam failure detection reference signal configuration of said another bandwidth is usable for performing beam failure detection on the dormant bandwidth.

According to a seventh aspect of the present invention, there is provided non-transitory computer readable medium having stored thereon a set of computer readable instructions that, when executed by at least one processor, cause an apparatus to at least perform the first method. According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EMBODIMENTS

Embodiments of the present invention enable beam failure detection for dormant Bandwidth Parts, BWPs, in cellular communication networks. A User Equipment, UE, may for example determine a Beam Failure Detection-Reference Signal, BFD-RS, configuration for the dormant BWP based on a BFD-RS configuration of another BWP. Said another BWP may be, e.g., a BWP of a serving cell of the UE, a BWP of another cell or a BWP in a group of BWPs. After said determination, the UE may perform beam failure detection on the dormant BWP according to the determined BFD-RS configuration.

Figure 1:
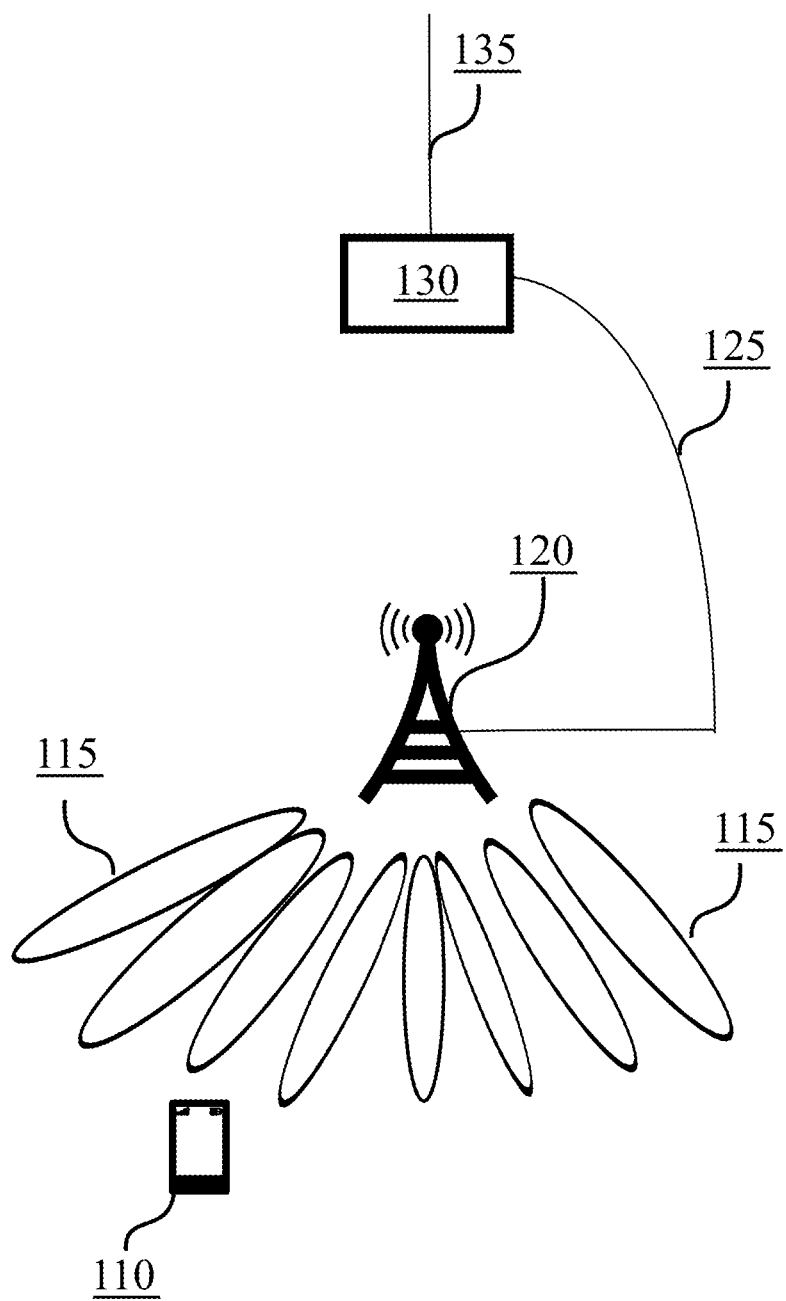
FIG. 1 illustrates an exemplary network scenario in accordance with at least some embodiments.

FIG. 1 illustrates an exemplary network scenario in accordance with at least some embodiments. According to the example scenario of FIG. 1, there may be a beam-based wireless communication system, which comprises UE 110, Base Station, BS, 120, and core network element 130. UE 110 may be connected to BS 120 via air interface using beams 115.

UE 110 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, another kind of suitable wireless terminal. In the example system of FIG. 1, UE 110 may communicate wirelessly with a cell of BS 120 via at least one beam 115. BS 120 may be considered as a serving BS for UE 110 and the cell of BS 120 may be a serving cell for UE 110. Air interface between UE 110 and BS 120 may be configured in accordance with a Radio Access Technology, RAT, which both UE 110 and base station 120 are configured to support.

Examples of cellular RATs include Long Term Evolution, LTE, New Radio, NR, which may also be known as fifth generation, 5G, radio access technology and MulteFire. For example, in the context of LTE, BS 120 may be referred to as eNB while in the context of NR, BS 120 may be referred to as gNB. In any case, embodiments of the present invention are not restricted to any particular wireless technology. Instead, embodiments may be exploited in any system which uses beam failure detection and dormant BWPs.

BS 120 may be connected, directly or via at least one intermediate node, with core network 130 via interface 125. Core network 110 may be, in turn, coupled via interface 135 with another network (not shown in FIG. 1), via which connectivity to further networks may be obtained, for example via a worldwide interconnection network. BS 120 may be connected with at least one other BS as well via an inter-base station interface (not shown in FIG. 1), even though in some embodiments the inter-base station interface may be absent. BS 120 may be connected, directly or via at least one intermediate node, with core network 130 or with another core network.

Dormant like behaviour with multiple BWPs may be applied for UE 110. That is to say, at most one BWP may be configured as dormant for UE 110 and at least one other BWP may be configured as non-dormant for UE 110. Additional BWPs, i.e., BWPs that are not configured as dormant or non-dormant BWPs, may be considered as regular BWPs. Dormant BWP may be a BWP without downlink control channel monitoring, such as Physical Downlink Control Channel, PDCCH, monitoring. Dormant BWPs may also not have most, if any, operation in uplink.

A concept of a dormant Secondary Cell, SCell, may be implemented by defining a dormant BWP. The dormant BWP may refer to a BWP which does not need to be monitored by UE 110 when activated for UE 110. More specifically, UE 110 does not need to monitor a downlink control channel, such as PDCCH, on that BWP. Thus, the SCell may be in a dormant state. If UE 110 is indicated to switch the SCell to a non-dormant state, UE 110 may switch to another BWP. Said another BWP may be referred as the "first BWP after dormancy", i.e., a specific BWP that UE 110 switches to. When the SCell is deactivated, UE 110 may have a Radio Resource Control, RRC, configuration for that SCell but e.g. measurements/reporting does not take place. So, the dormant SCell, may refer a cell for which UE is not monitoring the downlink control channel, i.e., wherein UE 110 is on the dormant BWP.

That is to say, UE 110 may be inactive in terms of the downlink control channel on the dormant BWP. UE 110 may be expected to carry out, e.g., Channel State Information, CSI, measurement on the dormant BWP though.

The network, such as BS 120, may switch UE 110 between dormant and non-dormant BWPs, for example with 1-bit indication. Switching may be done inside or outside active time. As an example, active time may be defined to be a time when UE 110 is required to monitor PDCCH or alternatively it may be defined as specified, e.g., in 38.321, where the active time includes the time while drx-onDurationTimer or drx-InactivityTimer or drx-RetransmissionTimerDL or drx-RetransmissionTimerUL or ra-ContentionResolutionTimer would be running. When UE 110 is outside active time, it may monitor DCP (DCI with CRC scrambled by PS-RNTI) which may indicate UE 110 to start the drx-onDurationTimer on the next occurrence of the timer.

In other words, the network, such as BS 120, may transmit an indication to UE 110, the indication indicating that UE 110 needs to switch from a dormant BWP to a non-dormant BWP. Responsive to receiving the indication, UE 110 may switch from the dormant BWP to a first non-dormant BWP for downlink control channel monitoring. The first non-dormant BWP may be different depending on whether operating inside or outside active time.

Beam failure detection is typically based on configured BFD-RS signals, either implicitly or explicitly. The network, such as BS 120, may configure UE 110 with a set of reference signals for monitoring a quality of a link, i.e., a quality of a beam. The set of reference signals may be referred to as q0 or BFD-RSs. For instance, the BFD-RSs may be configured so that the BFD-RSs are Quasi-CoLocated, QCLed, with PDCCH Demodulation Reference Signals, DMRSs, i.e., the BFD-RSs correspond to downlink beams used to transmit a downlink control channel, such as PDCCH. Downlink beams may be identified by reference signals, such Synchronization Signals, SS, /Physical Broadcast Channel, PBCH, block index or a Channel State Information-Reference Signal, CSI-RS, resource index. The network may configure a list of BFD-RSs using Radio Resource Control, RRC, signalling for example, or in some cases with combined RRC+Media Access Control, MAC, control element signalling.

If UE 110 is not explicitly configured with the list of BFD-RSs, UE 110 may determine BFD-RS resources implicitly based on, e.g., activated PDCCH—Transmission Configuration Indicator, TCI, states per Control Resource Set, CORESET. That is to say, UE 110 may determine BFD-RS resources implicitly based on downlink reference signals for example, such as CSI-RS s and SS/PBCH blocks that are QCLed with PDCCH DMRS, or in other words, PDCCH beams.

Concerning dormant BWPs, although an explicit BFD-RS configuration for a dormant BWP may be possible, it would not be beneficial to use such explicit configuration as the reference signal would need to be update using RRC signalling. An implicit BFD-RS configuration for the dormant BWP, e.g., where UE 110 determines resources for failure detection based on active TCI states for PDCCH, may not be feasible as UE 110 does not monitor a downlink control channel, such as PDCCH, on the dormant BWP.

Embodiments of the present invention therefore enable beam failure recovery and detection on dormant BWPs. Performing failure detection already on a dormant BWP improves recovery latency since UE 110 does not need to wait to declare failure later on.

In some embodiments of the present invention, the network, such as BS 120, may determine that there is no need to provide e.g., active TCI state for a downlink control channel, such as PDCCH, from which UE 110 could derive BFD-RS configuration for the dormant BWP or an explicit BFD-RS configuration for the dormant BWP to UE 110. That is to say, BS 120 may determine that there is no need to provide an active TCI state for PDCCH or an explicit BFD-RS configuration for the dormant BWP, to be used for determining a BFD-RS configuration for the dormant BWP. Instead, BS 120 may transmit to UE 110 a BFD-RS configuration of another BWP, wherein the BFD-RS configuration of said another BWP is usable for performing beam failure detection on the dormant BWP.

So, UE 110 may not have been provided with, e.g., active TCI state (or states) for PDCCH from which UE 110 could derive BFD-RS configuration for the dormant BWP or an explicit BFD-RS configuration for the dormant BWP. UE 110 may thus detect that no active TCI state for PDCCH or an explicit BFD-RS configuration for the dormant BWP has been provided, e.g., by BS 120.

After said detection or the behaviour of UE 110, UE 110 may be specified/configured/implemented so that, UE 110 may assume implicit configuration of the BFD-RS for the dormant BWP based on the BFD-RS configuration of said another BWP. For instance, UE 110 may determine the BFD-RS configuration for the dormant BWP based on the BFD-RS configuration of said another BWP. As an example, UE 110 may determine that same or partially same CSI-RS configuration is provided for dormant BWP and said another BWP based on the CSI-RS configurations. In some cases, the network, such as BS 120, may provide information to UE 110, said information indicating that a CSI-RS configuration of one BWP is the same as for said another BWP, e.g., via cross-BWP QCL assumption, i.e., CSI-RS or other downlink reference signals is transmitted on different BWPs or carriers using same transmission characteristics such as QCL type-D or using another configuration means. In one example, network may configure CSI-RS resource (or resources) for the dormant BWP and indicate a QCL source for the configured signals to be CSI-RS (or DL RS) of another BWP. QCL-type-D assumption between downlink reference signals may indicate to UE 110 that it may use same spatial RX filter to receive the signals, i.e., UE 110 may use same RX beam for reception. Other QCL types, such as A, B and C, are not excluded though. Alternatively, the network may indicate that CSI-RS configurations of different BWPs are the same or UE 110 may determine that the identifiers of CSI-RS resource sets of different BWPs are the same. These are merely examples, and embodiments of the present invention may be applied even if UE 110 would use some other ways to determine the BFD-RS configuration for the dormant BWP based on the BFD-RS configuration of said another BWP.

In some embodiments, UE 110 may assume implicit configuration of the BFD-RS for the dormant BWP based on active TCI states for PDCCH of said another BWP, i.e., determine the BFD-RS configuration for the dormant BWP based on the active TCI states for PDCCH of said another BWP. Active TCI state for PDCCH may indicate that the PDCCH DMRSs are QCL'd with the activated TCI state (such as CSI-RS, CSI-RS for tracking, SSB or other downlink reference signal) That is to say, UE 110 may use the BWP TCI state configuration of a non-dormant BWP to derive, i.e., determine the failure detection resources on dormant BWP. In one example, UE 110 may include the periodic CSI-RS indicated by the TCI state for PDCCH or in some cases UE 110 may determine to use the source RS of the TCI state as BFD-RS. In one example the BFD-RS may be SSB or CSI-RS.

For instance, UE 110 may determine the BFD-RS configuration for the dormant BWP based on the BFD-RS configuration of said another BWP when, or if, a frequency domain location and bandwidth of said another BWP correspond to a frequency domain location and bandwidth of the dormant BWP. Alternatively, or in addition, UE 110 may determine the BFD-RS configuration for the dormant BWP based on the BFD-RS configuration of said another BWP when, or if, a frequency domain location and bandwidth of said another BWP comprise a frequency domain location and bandwidth of the dormant BWP. That is to say, UE 110 may assume implicit configuration of BFD-RS based on the active TCI states for PDCCH of said another BWP if the frequency domain location and bandwidth of said another BWP correspond to the dormant BWP and/or if the frequency domain location and bandwidth of said another BWP include the dormant BWP. In some embodiments, the frequency domain location condition for determining the BDF-RS configuration may require only partial overlap of frequency domain resources.

In some embodiments, said another BWP may be a non-dormant BWP or a regular BWP. In an embodiment, said another BWP may be a BWP to which UE 110 may switch first after dormancy.

UE 110 may be associated with a cell and said another BWP may be a BWP of the same cell. For instance, said another BWP may be a BWP of a serving cell of UE 110. On the other hand, in some embodiments, UE 110 may be associated with the cell but said another BWP may be a BWP of another serving cell (such as Primary Cell, PCell, Primary Secondary Cell, PSCell, Special Cell, SpCell, or SCell).

Alternatively, or in addition, UE 110 may be explicitly configured from which BWP UE 110 may apply BFD-RS configuration for the dormant BWP, e.g., based on the active TCI states for PDCCH of that explicitly configured BWP. UE 110 may for example receive from BS 120 a configuration, the received configuration indicating from which BWP the BFD-RS configuration for the dormant BWP may, or is to be, determined. UE 110 may then determine the BFD-RS configuration for the dormant BWP based on the received configuration.

In some embodiments, when UE 110 determines the set of q0, i.e., the set of reference signals, for the dormant BWP based on said another BWP, UE 110 may determine to include only a subset of CSI-RSs, wherein the CSI-RSs may be the subset of CSI-RS transmitted in the dormant BWP that are the indicated by the activated TCI states of said another BWP, to the set of q0. In other words, only the subset of the CSI-RSs may be transmitted in the dormant BWP out of the all CSI-RSs that are transmitted on said another BWP and thus, UE 110 may not be able to monitor all the CSI-RSs that are configured as BFD-RSs (in another BWP) in the dormant BWP. UE 110 may then perform beam failure detection on the dormant BWP based on the subset of CSI-RS signals, i.e., on the CSI-RSs transmitted on the dormant BWP.

In some embodiments, UE 110 may determine to perform beam failure detection based on a QCL source of the CSI-RS indicated by the active TCI State for PDCCH, such as a Synchronization Signal Block, SSB, if an SSB is transmitted.

In some embodiments, UE 110 may assume an implicit configuration of BFD-RS for the dormant BWP based on another active serving cell, such as a SCell, PCell, PSCell or SpCell. That is to say, UE 110 may be associated with a cell of BS 120 and said another BWP may be a BWP of another cell, wherein the cell may be an active serving cell of UE 110 while said another cell may be an active serving cell of UE 110 as well. In some embodiments, UE 110 may assume implicit configuration of BFD-RS of another serving cell that is in dormant, or non-dormant state.

Said another cell may be explicitly configured by the network, such as BS 120, for each cell with a dormant BWP or derived implicitly by UE 110 based on a QCL source. Alternatively, UE 110 may be explicitly configured with a BFD-RS configuration or a set of BFD-RS configurations corresponding to any SSB/CSI-RS signals of said another cell, such as another serving cell, per serving cell BWP. The network may for example configure UE 110 to perform beam failure detection on the dormant BWP based on SSB (SS/PBCH)/CSI-RS signals of a PCell.

In some embodiments, a set of TCI-state identities for a downlink control channel, such as PDCCH, may be activated by BS 120, e.g., by transmitting a MAC CE for a set of Component Carriers, CCs, /BWPs to UE 110. Activation of the set of TCI-state identities may be referred to as a group-based update as well. In such a case, UE 110 may determine that signalling/activation applies also for the dormant BWP. Moreover, UE 110 may determine the BFD-RS configuration based on the active TCI states for the downlink control channel, such as PDCCH, and include to the set of q0 the CSI-RS that are transmitted on the dormant BWP.

Thus, the BFD-RS configuration of said another BWP may be a BFD-RS configuration of a group of BWPs and the group of BWPs may comprise said another BWPs. The BFD-RS configuration of the group of BWPs may be signalled to UE 110 by BS 120 explicitly.

In some embodiments, if UE 110 switches, or is switched by BS 120, to the dormant BWP, UE 110 may not perform beam failure detection. Alternatively or additionally, UE 110 may not perform beam failure detection if the dormant BWP is not configured with BFD-RS. In case UE 110 determines not to perform beam failure detection, UE 110 may stop and/or reset or continue a timer related to beam failure detections, such as the beamFailureDetectionTimer, and/or UE 110 may set or reset a counter related to a beam failure instance, such as the BFI_COUNTER, to value 0 or retain the value the counter had upon BWP switch.

In some embodiments, UE 110 may be configured by the network, such as BS 120, to perform "light" beam failure detection when UE 110 is operating on the dormant BWP. In such a case, UE 110 may be configured to report CSI, such as layer 1 Reference Signals Received Power, RSRP (or other CSI such as CQI, SINR or the like), one or more CSI-RS resources, resource sets or SSBs. If the highest measured or reported CSI is below a threshold, UE 110 may declare a beam failure for the dormant BWP. On the non-dormant BWP, UE 110 may perform beam failure detection according to current parameters and scaled parameters, i.e., use values so that the failure declaration is speeded up. Alternatively, UE 110 may determine on the dormant BWP the BFD-RS configuration to be the QCL with source SSB of any of the CSI-RS determined to be the BFD-RS configuration. In general, beam failure detection may be based on RSRP or Signal-to-Interference Ratio, SINR, for example.

Upon determining the BFD-RS configuration for the dormant BWP, UE 110 may perform beam failure detection on the dormant BWP according to the determined BFD-RS configuration. For instance, UE 110 may perform said beam failure detection according to the determined BFD-RS configuration by monitoring a downlink channel on the dormant BWP according to the determined configuration.

It should be noted that embodiments of the present invention do not propose to use the CSI-RS of said another BWP, because that would mean that UE 110 would actually have to tune to said another BWP. Instead, UE 110 may for example use the BWP TCI state configuration of said another BWP, such as a non-dormant BWP, to derive the failure detection resources on dormant BWP, i.e., the BFD-RS configuration. Even if reporting by UE 110 would be done similarly for dormant and non-dormant BWPs, it should be noted that it is not clear how downlink resources for BFD-RSs would be configured in such a case.

In some embodiments, it may be assumed that the dormant BWP would have at least partially same CSI-RS signals configured (for measurement) as said another BWP and thus the BFD-RS resources for the dormant BWP may be determined based on, e.g., the CSI-RS configuration and activated TCI state of said another BWP, such as the non-dormant BWP. Note that CSI-RS may be BWP specific and the dormant BWP may have a subset or of CSI-RS configuration or the same of said another BWP, such as the non-dormant BWP or any BWP on a same carrier.

Figure 2:
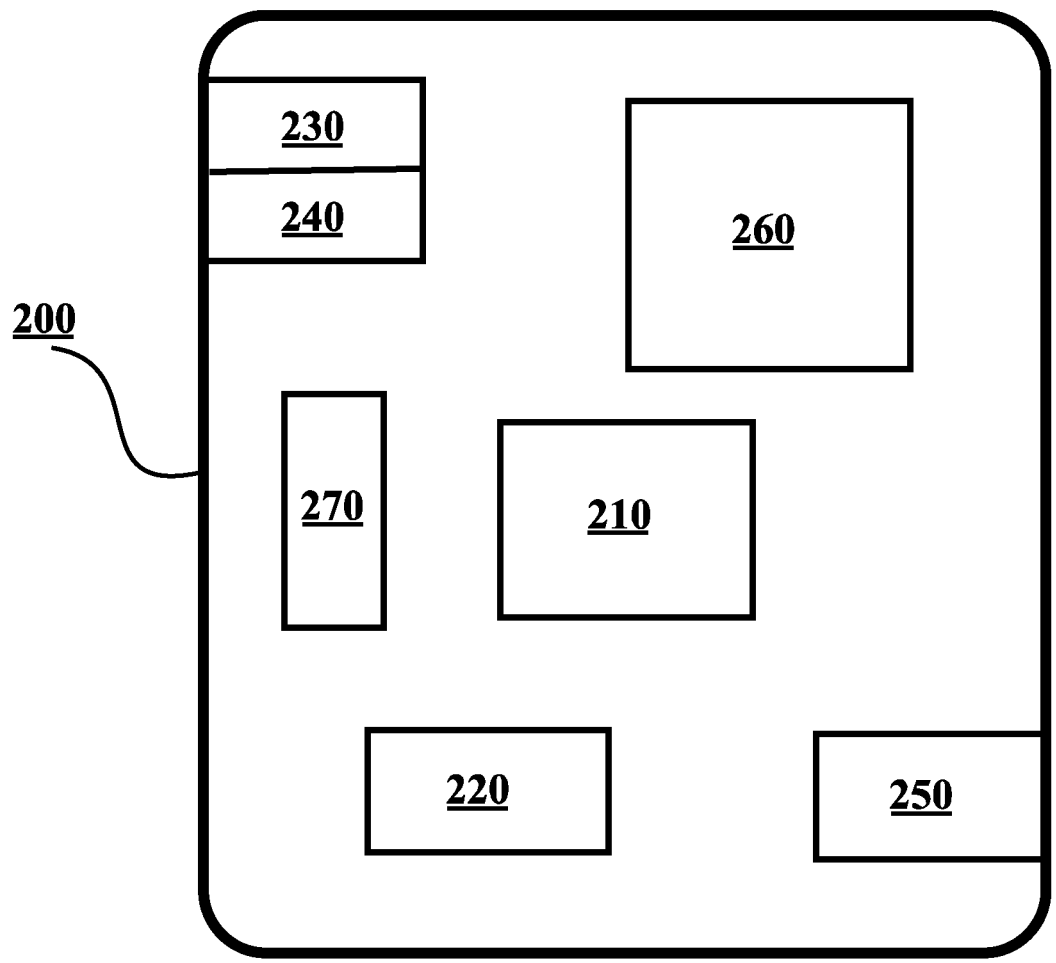
FIG. 2 illustrates an example apparatus capable of supporting at least some embodiments.

FIG. 2 illustrates an example apparatus capable of supporting at least some embodiments. Illustrated is device 200, which may comprise, for example, UE 110 or BS 120. Comprised in device 200 is processor 210, which may comprise, for example, a single- or multi-core processor wherein a single-core processor comprises one processing core and a multi-core processor comprises more than one processing core. Processor 210 may comprise, in general, a control device. Processor 210 may comprise more than one processor. Processor 210 may be a control device. A processing core may comprise, for example, a Cortex-A8 processing core manufactured by ARM Holdings or a Steamroller processing core produced by Advanced Micro Devices Corporation. Processor 210 may comprise at least one Qualcomm Snapdragon and/or Intel Atom processor. Processor 210 may comprise at least one application-specific integrated circuit, ASIC. Processor 210 may comprise at least one field-programmable gate array, FPGA. Processor 210 may be means for performing method steps in device 200. Processor 210 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 200 may comprise memory 220. Memory 220 may comprise random-access memory and/or permanent memory. Memory 220 may comprise at least one RAM chip. Memory 220 may comprise solid-state, magnetic, optical and/or holographic memory, for example. Memory 220 may be at least in part accessible to processor 210. Memory 220 may be at least in part comprised in processor 210. Memory 220 may be means for storing information. Memory 220 may comprise computer instructions that processor 210 is configured to execute. When computer instructions configured to cause processor 210 to perform certain actions are stored in memory 220, and device 200 overall is configured to run under the direction of processor 210 using computer instructions from memory 220, processor 210 and/or its at least one processing core may be considered to be configured to perform said certain actions. Memory 220 may be at least in part comprised in processor 210. Memory 220 may be at least in part external to device 200 but accessible to device 200.

Device 200 may comprise a transmitter 230. Device 200 may comprise a receiver 240. Transmitter 230 and receiver 240 may be configured to transmit and receive, respectively, information in accordance with at least one cellular or non-cellular standard. Transmitter 230 may comprise more than one transmitter. Receiver 240 may comprise more than one receiver. Transmitter 230 and/or receiver 240 may be configured to operate in accordance with Global System for Mobile communication, GSM, Wideband Code Division Multiple Access, WCDMA, Long Term Evolution, LTE, and/or 5G/NR standards, for example.

Device 200 may comprise a Near-Field Communication, NFC, transceiver 250. NFC transceiver 250 may support at least one NFC technology, such as Bluetooth, Wibree or similar technologies.

Device 200 may comprise User Interface, UI, 260. UI 260 may comprise at least one of a display, a keyboard, a touchscreen, a vibrator arranged to signal to a user by causing device 200 to vibrate, a speaker and a microphone. A user may be able to operate device 200 via UI 260, for example to accept incoming telephone calls, to originate telephone calls or video calls, to browse the Internet, to manage digital files stored in memory 220 or on a cloud accessible via transmitter 230 and receiver 240, or via NFC transceiver 250, and/or to play games.

Device 200 may comprise or be arranged to accept a user identity module 270. User identity module 270 may comprise, for example, a Subscriber Identity Module, SIM, card installable in device 200. A user identity module 270 may comprise information identifying a subscription of a user of device 200. A user identity module 270 may comprise cryptographic information usable to verify the identity of a user of device 200 and/or to facilitate encryption of communicated information and billing of the user of device 200 for communication effected via device 200.

Processor 210 may be furnished with a transmitter arranged to output information from processor 210, via electrical leads internal to device 200, to other devices comprised in device 200. Such a transmitter may comprise a serial bus transmitter arranged to, for example, output information via at least one electrical lead to memory 220 for storage therein. Alternatively to a serial bus, the transmitter may comprise a parallel bus transmitter. Likewise processor 210 may comprise a receiver arranged to receive information in processor 210, via electrical leads internal to device 200, from other devices comprised in device 200. Such a receiver may comprise a serial bus receiver arranged to, for example, receive information via at least one electrical lead from receiver 240 for processing in processor 210. Alternatively to a serial bus, the receiver may comprise a parallel bus receiver.

Device 200 may comprise further devices not illustrated in FIG. 2. For example, where device 200 comprises a smartphone, it may comprise at least one digital camera. Some devices 200 may comprise a back-facing camera and a front-facing camera, wherein the back-facing camera may be intended for digital photography and the front-facing camera for video telephony. Device 200 may comprise a fingerprint sensor arranged to authenticate, at least in part, a user of device 200. In some embodiments, device 200 lacks at least one device described above. For example, some devices 200 may lack a NFC transceiver 250 and/or user identity module 270.

Processor 210, memory 220, transmitter 230, receiver 240, NFC transceiver 250, UI 260 and/or user identity module 270 may be interconnected by electrical leads internal to device 200 in a multitude of different ways. For example, each of the aforementioned devices may be separately connected to a master bus internal to device 200, to allow for the devices to exchange information. However, as the skilled person will appreciate, this is only one example and depending on the embodiment various ways of interconnecting at least two of the aforementioned devices may be selected without departing from the scope of the embodiments.

Figure 3:
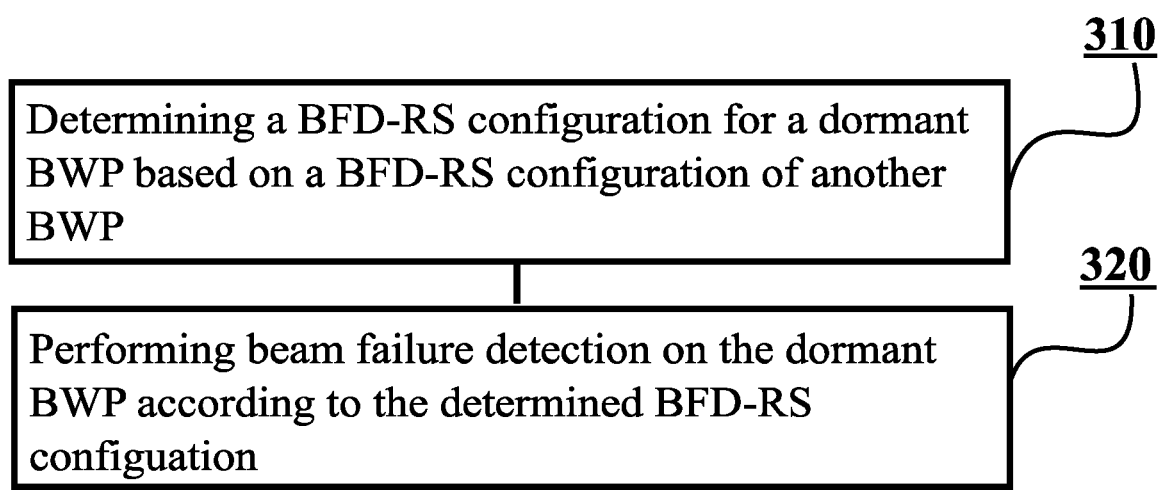
FIG. 3 illustrates a flow graph of a first method in accordance with at least some embodiments.

FIG. 3 is a flow graph of a first method in accordance with at least some embodiments. The phases of the illustrated first method may be performed by UE 110 or by a control device configured to control the functioning thereof, possibly when installed therein.

The first method may comprise, at step 310, determining a beam failure detection reference signal configuration for a dormant bandwidth part based on a beam failure detection reference signal configuration of another bandwidth part. The first method may also comprise, at step 320, performing beam failure detection on the dormant bandwidth part according to the determined beam failure detection reference signal configuration.

Figure 4:
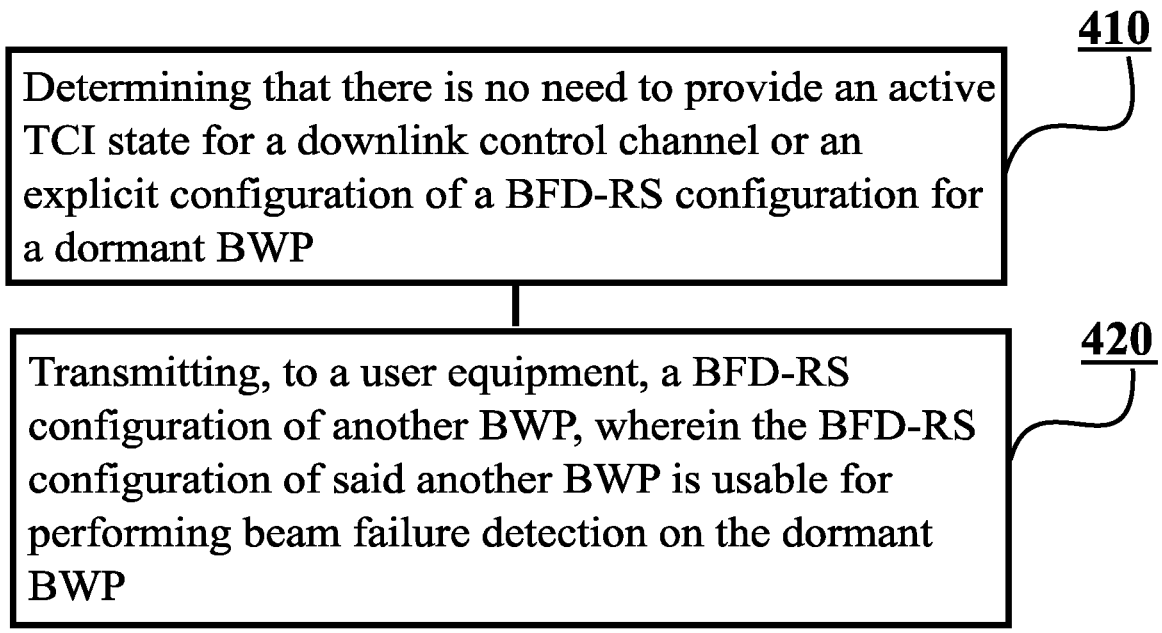
FIG. 4 illustrates a flow graph of a second method in accordance with at least some embodiments.

FIG. 4 is a flow graph of a second method in accordance with at least some embodiments. The phases of the illustrated second method may be performed by BS 120 or by a control device configured to control the functioning thereof, possibly when installed therein.

The second method may comprise, at step 410, determining that there is no need to provide an active transmission configuration indicator state for a downlink control channel or an explicit configuration of a beam failure detection reference signal configuration, to be used for determining a beam failure detection reference signal configuration for a dormant bandwidth part. The second method may also comprise, at step 420, transmitting, to a user equipment, a beam failure detection reference signal configuration of another bandwidth part, wherein the beam failure detection reference signal configuration of said another bandwidth is usable for performing beam failure detection on the dormant bandwidth.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, UE 110 or BS 120, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, UE 110 or BS 120, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in cellular communication networks, for example in 3GPP networks wherein it is desirable to enable enable beam failure detection on a dormant BWP.

ACRONYMS LIST

3GPP 3rd Generation Partnership Project
BFD-RS Beam Failure Detection-Reference Signal
BS Base Station
BWP Bandwidth Part
CC Component Carrier
CORESET Control Resource Set
CSI-RS Channel State Information-Reference Signal
DMRS Demodulation Reference Signal
GSM Global System for Mobile communication
IoT Internet of Things
LTE Long-Term Evolution
M2M Machine-to-Machine
MAC Media Access Control
NFC Near-Field Communication
NR New Radio
PBCH Physical Broadcast Channel
PCell Primary Cell
PDCCH Physical Downlink Control Channel
PSCell Primary Secondary Cell
QCL Quasi Co-Location
RAN Radio Access Network
RAT Radio Access Technology
RRC Radio Resource Control
RSRP Reference Signals Received Power
SCell Secondary Cell
SINR Signal-to-Interference Ratio
SpCell Special Cell
SS Synchronization Signal
SSB Synchronization Signal Block
TCI Transmission Configuration Indicator
UE User Equipment
UI User Interface
WCDMA Wideband Code Division Multiple Access

| REFERENCE SIGNS LIST | |
|---|---|
| 110 | User Equipment |
| 115 | Beams |
| 120 | Base Station |
| 125, 135 | Wired interfaces |
| 130 | Core Network |
| 200-270 | Structure of the apparatus of FIG. 2 |
| 310-320 | Phases of the first method in FIG. 3 |
| 410-420 | Phases of the second method in FIG. 4 |

The invention claimed is:

1. An apparatus comprising at least one processing core, at least one memory including computer program code, the at least one memory and the computer program code being configured to, with the at least one processing core, cause the apparatus at least to:
 determine a beam failure detection reference signal configuration for a dormant bandwidth part based on a beam failure detection reference signal configuration of another bandwidth part, wherein there is no reference signal configured for beam failure detection on the dormant bandwidth part and there is at least one reference signal configured for beam failure detection by the beam failure detection reference signal configuration on said another bandwidth part; and
 perform beam failure detection on the dormant bandwidth part according to the determined beam failure detection reference signal configuration.

2. The apparatus according to claim 1, wherein the at least one memory and the computer program code are further configured to, with the at least one processing core, cause the apparatus at least to:
 determine the beam failure detection reference signal configuration for the dormant bandwidth part based on the beam failure detection reference signal configuration of said another bandwidth part upon detecting that no active transmission configuration indicator state for a downlink control channel for the dormant bandwidth part has been provided.

3. The apparatus according to claim 1, wherein said another bandwidth part is a non-dormant bandwidth part or a regular bandwidth part.

4. The apparatus according to claim 1, wherein the at least one memory and the computer program code are further configured to, with the at least one processing core, cause the apparatus at least to:
 assume that the beam failure detection reference signal configuration for the dormant bandwidth part is based on active transmission configuration indicator states for a downlink control channel of said another bandwidth part.

5. The apparatus according to claim 1, wherein the at least one memory and the computer program code are further configured to, with the at least one processing core, cause the apparatus at least to:
 determine the beam failure detection reference signal configuration for the dormant bandwidth part based on the beam failure detection reference signal configuration of said another bandwidth part when a frequency domain location and bandwidth of said another bandwidth part correspond to a frequency domain location and bandwidth of the dormant bandwidth part.

6. The apparatus according to claim 1, wherein the at least one memory and the computer program code are further configured to, with the at least one processing core, cause the apparatus at least to:
 determine the beam failure detection reference signal configuration for the dormant bandwidth part based on the beam failure detection reference signal configuration of said another bandwidth part when a frequency domain location and bandwidth of said another bandwidth part comprise a frequency domain location and bandwidth of the dormant bandwidth part.

7. The apparatus according to claim 1, wherein said another bandwidth part is a bandwidth part of a serving cell of the apparatus.

8. The apparatus according to claim 1, wherein the apparatus is associated with a cell and said another bandwidth part is a bandwidth part of the same cell.

9. The apparatus according to claim 1, wherein the apparatus is associated with a cell and said another bandwidth part is a bandwidth part of another cell.

10. The apparatus according to claim 1, wherein the beam failure detection reference signal configuration of said another bandwidth part is a beam failure detection reference signal configuration of a group of bandwidth parts and the group of bandwidth parts comprises said another bandwidth part.

11. The apparatus according to claim 1, wherein the at least one memory and the computer program code are further configured to, with the at least one processing core, cause the apparatus at least to:
 receive a configuration, wherein the received configuration indicates from which bandwidth part the beam failure detection reference signal configuration for the dormant bandwidth part is to be determined; and
 determine the beam failure detection reference signal configuration for the dormant bandwidth part based on the received configuration.

12. The apparatus according to claim 1, wherein the at least one memory and the computer program code are further configured to, with the at least one processing core, cause the apparatus at least to:
 receive the beam failure detection reference signal configuration of said another bandwidth part, wherein the beam failure detection reference signal configuration of said another bandwidth part is usable for performing beam failure detection on the dormant bandwidth.

13. The apparatus according to claim 1, wherein the apparatus is inactive in terms of control channel monitoring on the dormant bandwidth part.

14. The apparatus according to claim 1, wherein the at least one memory and the computer program code are further configured to, with the at least one processing core, cause the apparatus at least to:
 perform said beam failure detection on the dormant bandwidth part according to the determined beam failure detection reference signal configuration by monitoring a downlink channel on the dormant bandwidth part according to the determined configuration.

15. An apparatus comprising at least one processing core, at least one memory including computer program code, the at least one memory and the computer program code being configured to, with the at least one processing core, cause the apparatus at least to:
 determine that there is no need to provide an active transmission configuration indicator state for a downlink control channel or an explicit configuration of a beam failure detection reference signal configuration, to be used for determining a beam failure detection reference signal configuration for a dormant bandwidth part; and transmit, to a user equipment, a beam failure detection reference signal configuration of another bandwidth part, wherein the beam failure detection reference signal configuration of said another bandwidth is usable for performing beam failure detection on the dormant bandwidth part, wherein there is no reference signal configured for beam failure detection on the dormant bandwidth part and there is at least one reference signal configured for beam failure detection by the beam failure detection reference signal configuration on said another bandwidth part.

16. The apparatus according to claim 15, wherein at least one of: said another bandwidth part is a non-dormant bandwidth part or a regular bandwidth part, or said another bandwidth part is a bandwidth part of a serving cell of the user equipment.

17. The apparatus according to claim 15, wherein the user equipment is associated with a cell and said another bandwidth part is a bandwidth part of the same cell.

18. The apparatus according to claim 15, wherein the user equipment is associated with a cell and said another bandwidth part is a bandwidth part of another cell.

19. The apparatus according to claim 15, wherein the at least one memory and the computer program code are further configured to, with the at least one processing core, cause the apparatus at least to:
transmit a configuration, wherein the transmitted configuration indicates from which bandwidth part the beam failure detection reference signal configuration for the dormant bandwidth part is to be determined.

20. A method, comprising:
determining a beam failure detection reference signal configuration for a dormant bandwidth part based on a beam failure detection reference signal configuration of another bandwidth part; and
performing beam failure detection on the dormant bandwidth part according to the determined beam failure detection reference signal configuration, wherein there is no reference signal configured for beam failure detection on the dormant bandwidth part and there is at least one reference signal configured for beam failure detection by the beam failure detection reference signal configuration on said another bandwidth part.

* * * * *